United States Patent [19]

Hisazumi et al.

[11] 4,166,082

[45] Aug. 28, 1979

[54] VINYLIDENE CHLORIDE COPOLYMER FILM HAVING HIGH BUBBLE STABILITY IN INFLATION-STRETCHING PROCESS AND COLD RESISTANCE

[75] Inventors: Nobuyuki Hisazumi; Shinichiro Funabashi, both of Iwaki, Japan

[73] Assignee: Kureha Kagaku Kogyo Kabushiki Kaisha, Tokyo, Japan

[21] Appl. No.: 798,571

[22] Filed: May 19, 1977

[30] Foreign Application Priority Data

May 20, 1976 [JP] Japan ................................ 51/58168

[51] Int. Cl.$^2$ .................. C08L 51/00; C08L 53/00
[52] U.S. Cl. .................................... 525/78; 260/23; 260/31.6; 260/31.8 M; 264/95; 264/182; 264/557; 264/178 R; 525/83; 525/84; 525/86; 525/87
[58] Field of Search .............. 264/95; 200/876 R, 899

[56] References Cited

U.S. PATENT DOCUMENTS

| 2,452,080 | 10/1948 | Stephenson | 264/89 X |
| 3,922,320 | 11/1975 | Love | 260/876 R |
| 3,960,869 | 6/1976 | Heichele et al. | 260/876 R |
| 4,041,106 | 8/1977 | Ide et al. | 260/876 R |

Primary Examiner—Richard B. Turer

Attorney, Agent, or Firm—Oblon, Fisher, Spivak, McClelland & Maier

[57] ABSTRACT

A vinylidene chloride copolymer film having excellent bubble stability in an inflation-stretching process and excellent cold resistance is prepared by inflation-stretching a tubular amorphous substance obtained by melt-extruding and quenching a composition comprising vinylidene chloride copolymer, a miscible type elastomer (A component) and a particle dispersion type elastomer (B component) in a range surrounded by the lines (a), (b), (c) and (d)

$$Y = \frac{40}{50} \times X + 20 \quad (a)$$

$$X = 5 \quad (b)$$

$$Y = 10 \quad (c)$$

$$X = 50 \quad (d)$$

wherein a weight percent of the B component to total elastomers is plotted on X axis (abscissa) and a weight percent of total content of the A component and the B component to total components is plotted on Y axis (ordinate).

4 Claims, 3 Drawing Figures

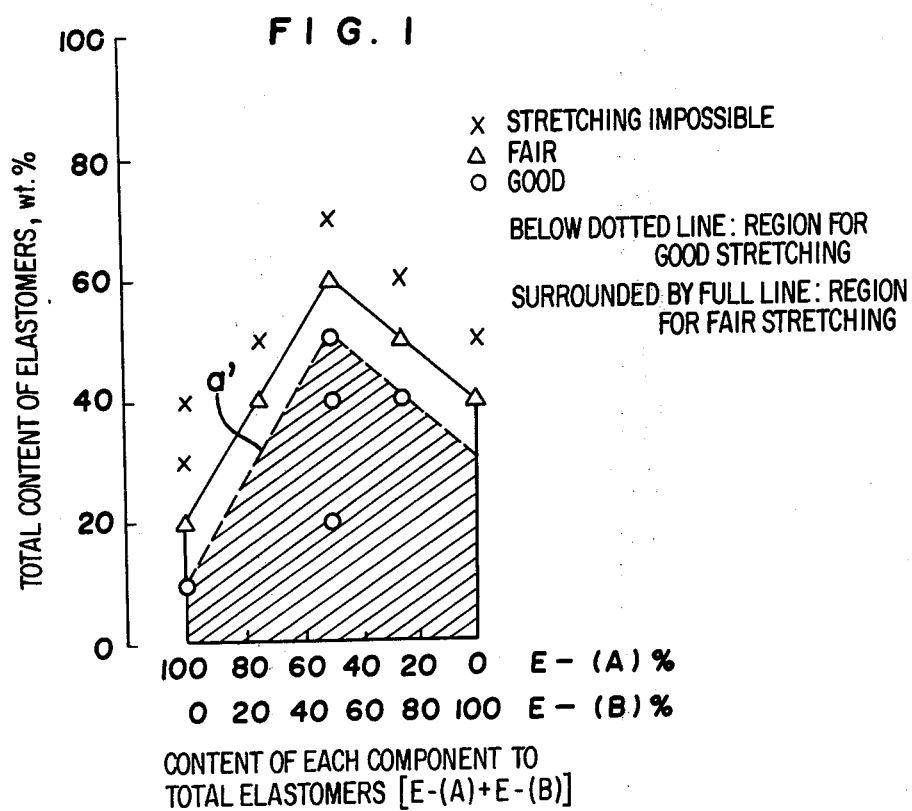

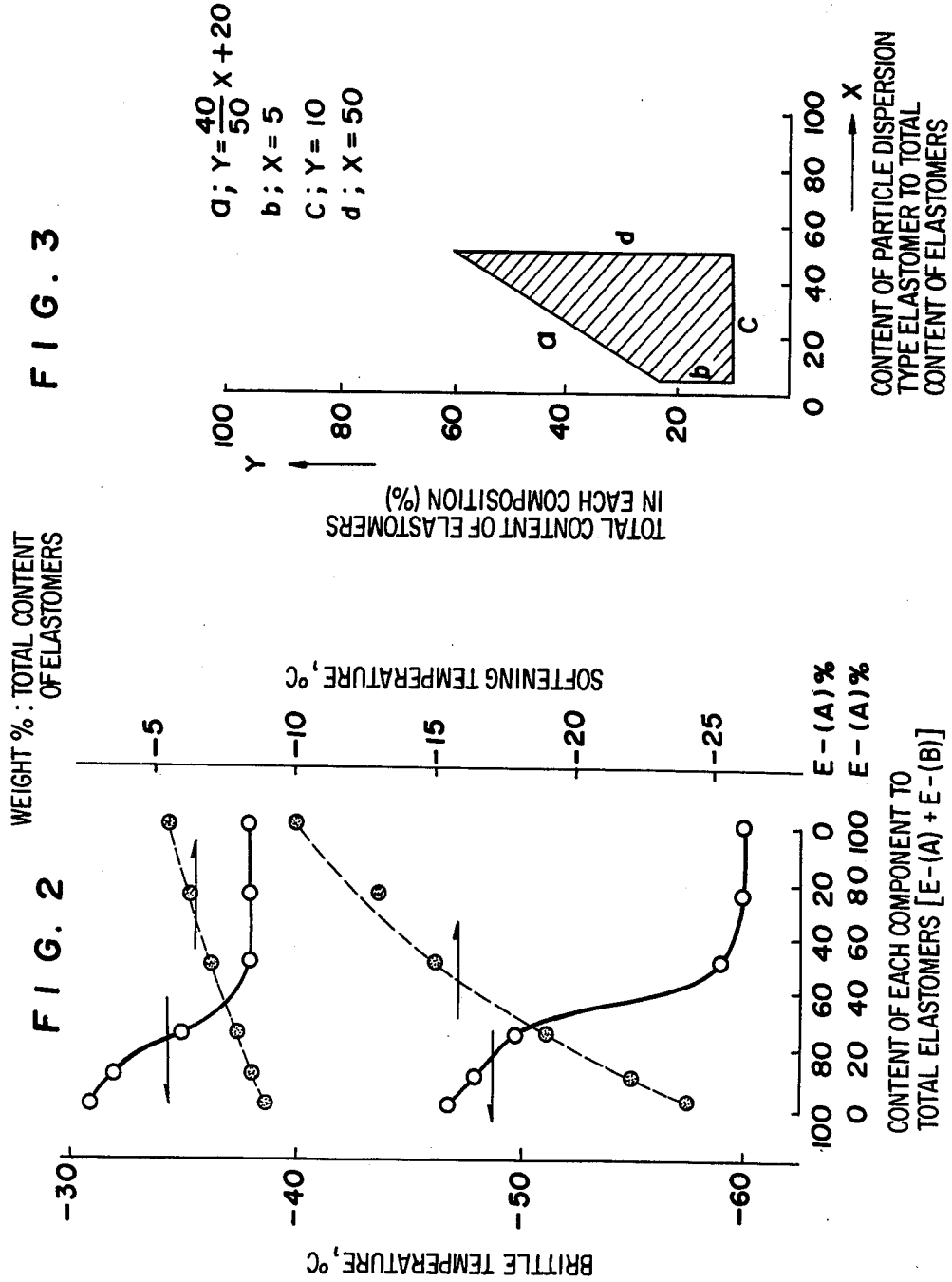

VINYLIDENE CHLORIDE COPOLYMER FILM HAVING HIGH BUBBLE STABILITY IN INFLATION-STRETCHING PROCESS AND COLD RESISTANCE

BACKGROUND OF THE INVENTION

The present invention relates to an improvement of vinylidene chloride copolymer film. More particularly, it relates to a film having remarkably improved inflation-stretching processability and cold resistance which is prepared by combining a miscible type elastomer and a small amount of a particle dispersion type elastomer with vinylidene chloride copolymer.

The vinylidene chloride copolymer has been widely used for preparing package film and container for food, because of excellent characteristics such as excellent heat shrinkage, low gas permeability, transparency, chemical stability, flameproofing property and heat-sealability of the product thereof.

However, when vinylidene chloride copolymer is used for preparing package film or container, the cold resistance of the product which is one of important requisite characteristics is inadequate, so that the product is easily broken in a package of frozen food or during handling in a frozen place. Accordingly, polyolefin products having high gas permeability or expensive laminated products have been used.

In order to improve the strength of a single layer product at low temperature, it has been known to add a plasticizer, or to add an internal plasticizer or an elastomer etc..

In the addition of the plasticizer, the miscible content of the plasticizer is limited. When the content of the plasticizer is more than 10 wt. %, the migration of the plasticizer on the surface of the product is excessive, so that the appearance is inferior and the low gas permeability of the product is lost, making it unsatisfactory for storage of food.

Moreover, the plasticizer is easily migrated into the food and accordingly, an addition of a large amount of the plasticizer is not preferable from the viewpoint of hygiene. The improvement of the impact strength at low temperature with the plasticizer has not been satisfactory.

The internal plasticization highly affects the crystallinity of vinylidene chloride copolymer which is one of the important characteristics whereby the low gas permeability is deteriorated to a greater degree than by use of a plasticizer. Accordingly, the internal plasticization has not been satisfactory.

The addition of an elastomer causes low miscibility to deteriorate the transparency and only few kinds of elastomers can be practically used.

These elastomers include miscible elastomers having high miscibility such as copolymers of an olefin and a vinyl ester, a vinyl carboxylic acid or a vinyl carboxylic acid ester, or particle dispersion type elastomers having high miscibility on the surface which are produced by a polymerization of a monomer adsorbed on elastomer particles to form the miscible type elastomer coating.

These elastomers have been respectively added to vinylidene chloride copolymer as the method of improving the cold resistance in a molding method having no requisite of severe stretch processability such as a preparation of a tubular container molded by a mold or a sheet processed by a T die.

The particle dispersion type elastomer has been used for providing high elasticity and improving impact strength at low temperature to obtain a rigid container. The miscible type elastomer has been used for improving softness at low temperature to obtain a flexible sheet.

In order to prepare the object product of flexible film, it is preferable to use the miscible type elastomer. However, the content of the miscible type elastomer is remarkably limited in the inflation-stretching process for using the vinylidene chloride copolymer because the precise stretching property is required. Accordingly, it is difficult to attain satisfactory cold resistance such as high flexibility and high impact strength at low temperature.

Thus, the vinylidene chloride copolymer can be biaxially stretched by continuously forming a stable bubble by feeding compressed air at room temperature in a tubular parison prepared by melt-extruding it by a screw type extruder and immediately quenching it to maintain the amorphous condition.

In order to continuously carry out the inflation-stretching process, it is necessary to maintain low inner pressure in the bubble in order for it to be easily expandable and to have enough strength to overcome the inner pressure to be fixed by the crystallization at the stretch orientation.

When the miscible type elastomer is added to the vinylidene chloride copolymer, the dispersion unit is usually less than 500 Å to be highly miscible and the glass transition temperature is lowered by the plasticization.

Accordingly, the film can be flexible, however the breaking strength is lowered while the creep deformation and the elongation are highly increased whereby the shape fixing by the stretch orientation is not satisfactory and the bubble expansion is excessive and the film may be broken.

The bubble may be instable when more than 10 wt. % of the miscible type elastomer is added. The bubble formation may be difficult when more than 20 wt. % of the miscible type elastomer is added whereby it is difficult to give satisfactory cold resistance because of the limitation of the content of the miscible type elastomer in the shaping process.

SUMMARY OF THE INVENTION

It is an object of the present invention to provide a vinylidene chloride copolymer film having satisfactory cold resistance and impact strength at low temperature as well as characteristics of desired heat shrinkage, low gas permeability, transparency, chemical stability, flameproofing property and heat sealing property.

The foregoing and other objects of the present invention have been attained by providing a vinylidene chloride copolymer film prepared by inflation-stretching a tubular amorphous substance obtained by melt-extruding and quenching a composition comprising a vinylidene chloride copolymer, a miscible type elastomer (A component) and a particle dispersion type elastomer (B component) in a range surrounded by the lines (a), (b), (c) and (d)

$$Y = \frac{40}{50} X + 20 \tag{a}$$

$$X = 5 \tag{b}$$

$$Y = 10 \quad \text{(c)}$$

$$X = 50 \quad \text{(d)}$$

wherein a weight percent of the B component to total elastomers is plotted on X axis (abscissa) and a weight percent of total content of the A component and the B component to total components is plotted on Y axis (ordinate).

BRIEF DESCRIPTION OF THE DRAWINGS

FIG. 1 is a graph showing ranges of components for inflation-stretching property when vinylidene chloride copolymer is combined with the miscible type elastomer and the particle dispersion type elastomer.

FIG. 2 is a graph showing relationship of brittle temperature and softening temperature as the cold resistance and the ratio of A component to B component to add 20 to 40 wt.% of total amounts of the elastomers: and FIG. 3 is a graph showing the ranges of the components in the present invention.

Detailed Description of the Invention

The present invention is based on the finding of the fact that the special phenomenon is resulted to remarkably improve the inflation-stretching processability and the cold resistance by combining the miscible type elastomer and a small content of the particle dispersion type elastomer with the vinylidene chloride copolymer.

When the particle dispersion type elastomer is produced by polymerizing a small amount of a monomer for miscible elastomer on primary particles of a conventional elastomer (more than 500 Å of minimum particle unit in a suspension polymerization or an emulsion polymerization) to form less miscible part under maintaining the primary particle diameter in the dispersion and the elastomer is added to the vinylidene chloride copolymer, the impact strength at low temperature is improved, however the plasticizing effect is not given whereby the flexibility at low temperature is not improved and the object product of flexible film cannot be obtained.

Moreover, the plasticity is decreased and the elongation is decreased and the ultimate tensile strength is increased for the inflation-stretching processability by the addition, however the elasticity and the yield stress are remarkably increased, requiring exces pressure for the initiation of bubble expansion and accordingly, it is difficult to expand the bubble by the conventional method or it is easily broken because of high pressure difference between the inside and the outside of the bubble. Accordingly, the amount of the particle dispersion type elastomer is limited. The bubble is usually instable in the case of more than 30 wt.% of the elastomer and the bubble cannot be formed in the case of more than 40 wt.% of the elastomer.

However, when the particle dispersion type elastomer is further added to them in order to overcome the disadvantages caused by the addition of the miscible type elastomer to the vinylidene chloride copolymer such as the break of the bubble by decrease of the ultimate tensile strength and increase of elongation, the elongation is decreased and the ultimate tensile strength is increased to mutually affect them whereby the resulting composition can be used for the inflation-stretching process even though the total content of the elastomers is 60 wt.%.

The maximum total content of the elastomers is dependent upon the ratio of the miscible type elastomer to the particle dispersion type elastomer. When the ratio is 1:1, the peak of the maximum total content can be found. The cold resistance is not enough when the total content of the elastomers is less than 10 wt.%.

In accordance with the present invention, it is possible to easily obtain the vinylidene chloride copolymer tubular film having the cold resistance which is similar to that of polyolefins which are considered to have excellent cold resistance in the conventional inflation-stretching process.

When the miscible type elastomer and the particle dispersion type elastomer are blended to the vinylidene chloride copolymer, the former cause to remarkably fall the glass transition temperature Tg but the latter does not substantially cause to fall the glass transition temperature. The discrimination of the elastomers is easily attained from the phenomenon.

The other special phenomenon which is newly found for the combination of both of the elastomers in the present invention, is the elastomer ratio dependency for the impact strength at low temperature.

When the ratio of the miscible type elastomer to the particle dispersion type elastomer is varied in a constant total content of the elastomer to the vinylidene chloride copolymer, the non-linear phenomenon is remarkable.

In the range of the ratio of the miscible type elastomer to the particle dispersion type elastomer from 100:0 to 50:50, the impact strength at low temperature (brittle temperature) is remarkably increased and in the range of 50:50 to 0:100, the variation of the impact strength at low temperature is not substantially found.

In order to prepare the object product of flexible film, it is preferable to have a higher content of the miscible type elastomer for lowering the glass transition temperature. Accordingly, the ratio of the miscible type elastomer to the particle dispersion type elastomer is limited to 50:50 from the viewpoints of the limitation of improvement of the impact strength at low temperature (brittle temperature) and the softening temperature lowering effect.

The special phenomenon is caused by the different mechanism for contribution of the miscible type elastomer and the particle dispersion type elastomer to the impact strength at low temperature because the affinity and the dispersibility of the elastomers to the vinylidene chloride copolymer are remarkably different.

That is, the miscible type elastomer imparts softness at low temperature by plasticization to absorb the impact by the deformation of the vinylidene chloride copolymer whereas the particle dispersion type elastomer itself has the function as the impact absorber.

The present invention is to provide a vinylidene chloride copolymer film having excellent bubble stability in the inflation-stretching process and excellent cold resistance prepared by inflation-stretching a tubular amorphous substance obtained by melt-extruding and quenching the composition comprising the vinylidene chloride copolymer, the miscible type elastomer (A component) and the particle dispersion type elastomer (B component) in a range surrounded by the lines (a), (b), (c) and (d)

$$Y = \frac{40}{50} X + 20 \quad \text{(a)}$$

$$X = 5 \quad \text{(b)}$$
$$= 10 \quad \text{(c)}$$
$$X = 50 \quad \text{(d)}$$

wherein a weight percent of the B component to total elastomers is plotted on X axis (abscissia) and a weight percent of total content of the A component and the B component to total components is plotted on Y axis (ordinate).

The line (a) shows the limit for a composition which is capable of the inflation-stretching process. When total content of the elastomers in the composition is lower than the (a) line, the bubble stability in the inflation-stretching process is relatively good whereas a stable inflation-stretching process cannot be attained out of the range of the line (a).

In FIG. 1, the bubble stability is especially high in the range of the line (a') (Y=(40/50)X+10) in FIG. 1.

The line (b) shows the lower limit of the content of B component to total elastomers for imparting the effect of the B component (particle dispersion type elastomer). When the content of the B component to total elastomers is less than 5 wt.%, the effect for improving the bubble stability of the inflation film is too low.

The line (c) shows the lower limit of the total content of the elastomers for imparting desired cold resistance combining the elastomers with the vinylidene chloride copolymer. When the total content of the elastomers is less than 10 wt.%, the softening temperature and the brittle temperature are too high and the film having inferior cold resistance is obtained.

The line (d) is the lower limit of the content of the B component for imparting desired plasticization by the addition of the elastomers. When the content of the B component to the total elastomers is less than 50 wt.%, the brittle temperature is not substantially lowered but the softening temperature is raised disadvantageously even though the total content of the elastomers in the composition is increased.

From the viewpoint of the mechanical characteristics and the gas barrier characteristics, it is especially preferably to provide 35 wt.% or lower than 35 wt.% of total elastomers.

The vinylidene chloride copolymer used in the present invention is a copolymer having 60 to 95 wt.% of vinylidene chloride component and 5 to 40 wt.% of at least one comonomer component.

Suitable comonomers include vinyl chloride, acrylonitrile, acrylic acid, alkyl acrylates ($C_1$-$C_{18}$ alkyl group) methacrylic acid, alkyl methacrylates ($C_1$-$C_{18}$ alkyl group), maleic anhydride, itaconic acid, alkyl itaconates, vinyl acetate, ethylene, propylene, isobutylene, butadiene, etc.

When the content of the vinylidene chloride copolymer is less than 60 wt.%, the composition is rubber like at the room temperature, and the film having stable shape could not be obtained.

When the content of the vinylidene chloride copolymer is more than 95 wt.%, the melting point of the composition is too high and the stable melt-extrusion processing is difficult because of easy thermal decomposition.

If necessary, it is possible to add a plasticizer or a stabilizer as the conventional ones.

The miscible type elastomers are elastomers which have high miscibility to the vinylidene chloride copolymer.

Suitable miscible type elastomers include copolymers of a first group olefin monomer such as ethylene, propylene or isobutylene and a second group monomer such as vinyl acetate, vinyl propionate, acrylic acid, acrylic acid esters, methacrylic acid or methacrylic acid esters.

When the content of the second group monomer is in a range of 5 to 50 wt.%, the miscibility is advantageously good.

The particle dispersion type elastomer used in the present invention should have mutual inter-molecular effect to the vinylidene chloride copolymer to give a particle diameter of 500 to 5000 Å preferably 1000 to 3000 Å after blending it to the vinylidene chloride copolymer and it is preferably produced by controlling the particle diameter to form uniform particles in the polymerization and then polymerizing a small amount of the monomer for forming a polymer having high affinity to the vinylidene chloride copolymer. The graft polymer is suitable for the purpose of the invention.

That is, a monomer of butadiene or a monomer mixture of butadiene as main component and other monomer of styrene, acrylonitrile, methacrylate, vinylidene chloride, etc. is polymerized by an emulsion polymerization with or without a sall amount of a crosslinking agent such as divinyl benzene, ethyleneglycol dimethacrylate, 1,3-butyleneglycol dimethacrylate etc. and then, a monomer or monomer mixture of methyl methacrylate, styrene or vinylidene chloride with or without the crosslinking agent is absorbed and polymerized on the resulting polymer.

The ratio of an elastic component to a plastic component in the particle dispersion type elastomer is preferably in range of 5:5 to 8:2. When the content of the elastic component is less than 50 wt.%, the effect for improving the impact strength at low temperature is too low whereas when it is more than 80 wt.%, the miscibility is inferior and a transparent product cannot be obtained.

When the content of the crosslinking agent is too high, the elastic component is brittle to cause inferior elasticity and accordingly the content of the crosslinking agent is preferably less than 5 wt.%.

The present invention will be further illustrated by certain examples.

EXAMPLE 1

1. Sample:
(a) The following vinylidene chloride copolymer composition was used.

| | | |
|---|---|---|
| VD-(1) | Vinylidene chloride-vinyl chloride-dodecylacrylate copolymer (80 wt. % of vinylidene chloride; 13 wt. % of vinyl chloride) | 100 wt. parts |
| | Polybutyleneglycol adipate (plasticizer) | 7 wt. parts |
| | Epoxidized soybean oil | 1 wt. part |

(b) The following two types of elastomers were used.

| | |
|---|---|
| E-(A) | (miscible type elastomer) Ethylene-vinyl acetate copolymer (28 wt. % of vinyl acetate) |

-continued

| E-(B) | (particle dispersion type elastomer) |
|---|---|

Methyl methacrylate was adsorbed on particles of styrenebutadiene copolymer and then it was polymerized on it. (60 wt.% of butadiene; 25 wt.% of styrene) Primary particle diameter of about 2000 Å.

2. Inflation stretching property:

Each of mixtures of VD-(1), E-(A) and E-(B) at the following ratios was blended and extruded at the resin temperature of 180° C. through an annular die of a screw type extruder having a diameter of 60 mm and the extruded cylindrical parison was immediately quenched in a cold water at 5° to 20° C. and compressed air was fed into it between two pairs of pinch rollers having different surface velocity at the room temperature to expand it to be a thickness of the film of 40µ.

In the operation, the stretching property was observed by the relationship of the stretchability and stress-strain curve (speed of 1000 %/min.) of the amorphous sample (thickness of 400µ:width of 10 mm).

2-1 Combination of VD-(1) and E-(A):

The yield stress, the ultimate tensile strength, and the ultimate elongation of each composition of VD-(1) and EV-(A) comprising 10, 20, 30, or 40 wt.% of E-(A) component were measured from each stress-strain curve and the apparent glass transition temperature Tg of each composition was measured from the rigidity temperature dependency curve and the inflation stretching processability was observed and the creep degree was measured by cutting each film into a tape having a width of 10 mm and pulling the tape with a load of 10 Kg/cm$^2$ and measuring percent of the deformation after 10 minutes. These results are shown in Table 1.

Table 1

| E-(A) content (%) | Tg (°C.) | Non-stretched sample | | | Inflation stretching process-ability | Stretched sample creep degree (%/Kg/mm$^2$) |
| | | Yield stress (Kg/cm$^2$) | Ultimate tensile strength (Kg/cm$^2$) | Ultimate elongation (%) | | |
|---|---|---|---|---|---|---|
| 0 | −19 | 3.5 | 106 | 450 | good | 5 |
| 10 | −21 | 4.8 | 110 | 460 | good | 10 |
| 20 | −22 | 5.6 | 115 | 470 | fair | 30 |
| 30 | −28 | 8.0 | 110 | 550 | none break of bubble by creep | no sample |
| 40 | −36 | 9.4 | 70 | 610 | " | " |

2-2 Combination of VD-(1) an E-(B):

The same tests in 2-1 were made by adding 20, 40 or 50 wt.% of E-(B) to each composition of VD-(1) and E-(B). The results are shown in Table 2.

Table 2

| E-(B) content (%) | Tg (°C.) | Non-stretched sample | | | Inflation stretching process-ability | Stretched sample creep degree (%/Kg/mm$^2$) |
| | | Yield stress (Kg/cm$^2$) | Ultimate tensile strength (Kg/cm$^2$) | Ultimate elongation (%) | | |
|---|---|---|---|---|---|---|
| 0 | −19 | 3.5 | 106 | 450 | good | 5 |
| 20 | −19 | 15 | 145 | 400 | good | 7 |
| 40 | −19 | 24 | 146 | 330 | fair | 8 |
| 50 | −19 | 27 | 123 | 320 | none no expansion under excess internal pressure | no sample |

2-3 Combination of VD-(1), E-(A) and E-(B):

The inflation stretchability, the yield stress, the ultimate tensile strength and the ultimate elongation of each composition of VD-(1), E-(A) and E-(B) at ratios of E-(A) and E-(B) to VD-(1) of 1:3; 2:2; 3:1 were measured. The results are shown in Tables 3, 4 and 5.

Table 3

E-(A)/E-(B) = 75/25

| Total content of E-(A) and E-(B) (%) | Tg (°C.) | Non-stretched sample | | | Inflation stretching processability |
| | | Yield stress (Kg/cm$^2$) | Ultimate tensile strength (Kg/cm$^2$) | Ultimate elongation (%) | |
|---|---|---|---|---|---|
| 0 | −19 | 3.5 | 106 | 450 | good |
| 40 | −25 | 11 | 130 | 480 | fair |
| 50 | −33 | 13 | 108 | 510 | none break of bubble by creep |

Table 4

E-(A)/E-(B) = 50/50

| Total content of E-(A) and E-(B) (%) | Tg (°C.) | non-stretched sample | | | Inflation stretching processability |
| | | Yield stress (Kg/cm$^2$) | Ultimate tensile strength (Kg/cm$^2$) | Ultimate elongation (%) | |
|---|---|---|---|---|---|
| 0 | −19 | 3.5 | 106 | 450 | good |
| 20 | −21 | 9 | 130 | 440 | good |
| 40 | −23 | 14 | 144 | 440 | good |
| 50 | −25 | 17 | 145 | 430 | good |
| 60 | −28 | 19 | 130 | 430 | fair |
| 70 | −32 | 22 | 62 | 330 | none excess internal pressure break by creep |

Table 5

E-(A)/E-(B) = 25/75

| Total content of E-(A) and E-(B) (%) | Tg (°C.) | non-stretched sample | | | Inflation stretching processability |
| | | Yield stress (Kg/cm$^2$) | Ultimate tensile strength (Kg/cm$^2$) | Ultimate elongation (%) | |
|---|---|---|---|---|---|
| 0 | −19 | 3.5 | 106 | 450 | good |
| 40 | −21 | 17 | 150 | 400 | good |
| 50 | −21 | 20 | 150 | 340 | fair |
| 60 | −22 | 24 | 80 | 310 | none excess internal pressure break by creep |

Accordingly, the total contents in the inflation stretchable limitations are as shown in Table 6.

Table 6

| E-(A)/E-(B) | Total content in limitation (%) |
|---|---|
| 1 : 0 | 20 |
| 3 : 1 | 40 |
| 2 : 2 | 60 |
| 1 : 3 | 50 |
| 0 : 1 | 40 |

As shown in Tables, when only E-(A) was added, the content of E-(A) in the inflation stretchable limitation was remarkably low because of lowering Tg and increasing the ultimate elongation and the creep degree.

On the other hand, the total content of elastomers in the inflation stretchable limitation was remarkably increased by combining E-(B) which causes no change of Tg and a decrease of the ultimate elongation.

When the ratio of E-(A) to E-(B) was 50:50 by weight, the total content of elastomers in the inflation stretchable limitation could be the maximum of 60 wt.%.

3. Cold resistance:

The brittle temperature for the impact strength at low temperature and the softening temperature for the softness at low temperature of each composition of VD-(1) and E-(A) and/or E-(B) were measured. The results are shown in Table 7. The data on 20 or 20 wt.% of the total content of the elastomers are also shown in FIG. 2.

Table 7

| Total content of E-(A) and E-(B) (%) | E-(A)/E-(B) | Brittle temperature (°C.) | Softening temperature (°C.) |
|---|---|---|---|
| 0 |  | −10 | −2 |
| 10 | 100/0 | −19 | −6 |
|  | 50/50 | −23 | −5 |
|  | 0/100 | −23 | −4 |
|  | 100/0 | −31 | −9 |
|  | 90/10 | −32 | −8.5 |
|  | 75/25 | −35 | −8 |
| 20 | 50/50 | −37 | −7 |
|  | 25/75 | −38 | −6.5 |
|  | 0/100 | −38 | −5.5 |
|  | 100/0 | −40 | −18 |
| 30 | 75/25 | −44 | −15 |
|  | 50/50 | −53 | −12.5 |
|  | 0/100 | −54 | −8 |
|  | 100/0 | −47 | −24 |
|  | 90/10 | −48 | −22 |
| 40 | 75/25 | −50 | −19 |
|  | 50/50 | −59 | −15 |
|  | 25/75 | −60 | −13 |
|  | 0/100 | −60 | −10 |
|  | 100/0 | −53 | −30 |
|  | 75/25 | −55 | −25 |
| 50 | 50/50 | <−60 | −22 |
|  | 25/75 | <−60 | −19 |
|  | 0/100 | <−60 | −14 |
| 60 | 50/50 | <−60 | <−25 |

The brittle temperature was clearly lowered in the range of 100:0 to 50:50 of the ratio of E-(A) to E-(B) and it was not changed in the range of 50:50 to 0:100 as shown in Table 7 and FIG. 2.

It is preferable to have lower softening temperature for the object product of flexible film. Accordingly, the ratio of E-(A) to E-(B) is limited to 95:5 to 50:50 wherein the effect for lowering the brittle temperature was remarkable.

Accordingly, on the range for imparting desired stretchability in FIG. 1, 10 Wt.% of the content of E-(A) was the optimum in the conventional method. On the other hand, in accordance with the present invention, the total content of E-(A) and E-(B) at a ratio of E-(A) to E-(B) of 50:50, can be more than 50 wt.%. The brittle temperature can be lowered for more than 41° C. and the softening temperature can be lowered for more than 16° C. to remarkably improve the cold resistance.

EXAMPLE 2

In order to confirm the fact that the same results can be obtained even though the kind of the materials are varied, the inflation stretchability and the cold resistance of each composition using the following components were measured.

1. Material:

(a) Vinylidene chloride copolymer

| VD-(2) | Vinylidene chloride-vinyl chloride copolymer (80 wt. % of vinylidene chloride) | 100 wt. parts |
|---|---|---|
|  | Dioctyl adipate | 5 wt. parts |
|  | Epoxidized soybean oil | 1 wt. part |

(b) Elastomer:
E-(C) (Miscible type elastomer)
Ethylene-ethyl acrylate-vinyl acetate copolymer (55 wt. % of ethylene;; 10 wt. % of ethyl acrylate)
E-(D) (Miscible type elastomer)
Ethylene-vinyl chloride-vinyl acetate copolymer (55 wt. % of ethylene; 10 wt. % of vinyl chloride)
E-(E) (Particle dispersion type elastomer)

Methyl methacrylate was adsorbed on particles of styrenebutadiene copolymer crosslinked with divinyl benzene and then it was polymerized on it. (60 wt.% of butadiene; 25 wt.% of styrene; 1 wt.% of divinyl benzene) Primary particle diameter of 1500 A.

1. Inflation-stretching processability and cold resistance:

The inflation-stretching processability and the cold resistance of each composition prepared by combining the components in accordance with Example 1 were compared with the brittle temperature and the softening temperature of VD-(1) or VD-(2).

The differences of the brittle temperature or the differences of the softening temperature were shown as the lowering degree of brittle temperature or the lowering degree of softening temperature.

Table 8

|  | Vinylidene chloride copolymer | Elastomer | Ratio | Total content of elastomers (%) | Lowering degree of brittle temp. (°C.) | Lowering degree of softening temp. (°C.) | Inflation stretching processability |
|---|---|---|---|---|---|---|---|
| Ref. | VD-(2) | E-(C) | 100/0 | 10 | 8 | 8 | good |
|  |  | E-(C) | 100/0 | 20 | 19 | 16 | fair |
| Exp. | VD-(2) | E-(C)/E-(E) | 50/50 | 20 | 31 | 10 | good |
|  |  | E-(D)/E-(E) | 50/50 | 40 | 50 | 21 | good |

Table 8-continued

|  | Vinylidene chloride copolymer | Elastomer | Ratio | Total content of elastomers (%) | Lowering degree of brittle temp. (°C.) | Lowering degree of softening temp. (°C.) | Inflation stretching processability |
| --- | --- | --- | --- | --- | --- | --- | --- |
| Ref. | VD-(1) | E-(D) | 100/0 | 10 | 6 | 5 | good |
|  |  | E-(D) | 100/0 | 20 | 12 | 11 | fair |
| Exp. | VD-(1) | E-(D)/E-(E) | 50/50 | 20 | 28 | 8 | good |
|  |  | E-(D)/E-(E) | 50/50 | 40 | 49 | 15 | good |

As stated above, even though the components were changed, the effects are similar to those of Example 1 in the range of the present invention and the inflation stretching processability and the cold resistance were improved.

What is claimed:

1. A vinylidene chloride copolymer film having high bubble stability in an inflation-stretching process and excellent cold resistance, which is prepared by inflation-stretching a tubular amorphous substance obtained by melt-extruding and quenching a composition comprising vinylidene chloride polymer, a miscible type elastomer (A component) and a particle dispersion type elastomer (B component) in a range surrounded by the lines (a), (b), (c) and (d)

$$Y = \frac{40}{50} \times +20 \quad (a)$$

$$X = 5 \quad (b)$$

$$Y = 10 \quad (c)$$

$$X = 50 \quad (d)$$

wherein the weight percent of the B component to total elastomers is plotted on the X axis (abscissa) and the weight percent of total content of the A component and the B component to total components is plotted on the Y axis (ordinate);

wherein said particle dispersion type elastomer is produced by polymerizing butadiene with or without a comonomer of styrene, acrylonitrile, methacrylate or vinylidene chloride in an emulsion polymerization to form a polymer, and then adsorbing a monomer or a monomer mixture of methyl methacrylate, styrene, or vinylidene chloride on particles of the said polymer and polymerizing it on said particles; and wherein said miscible type elastomer is a copolymer of a first group olefin monomer of ethylene, propylene or isobutylene and a second group monomer of vinyl acetate, vinyl propionate, acrylic acid, acrylic acid esters, methacrylic acid or methacrylic acid esters.

2. A vinylidene chloride copolymer film according to claim 1 wherein said vinylidene chloride copolymer is a copolymer having 60 to 95 wt.% of vinylidene chloride component and 5 to 40 wt.% of at least one comonomer component selected from the group consisting of vinyl chloride, acrylonitrille, acrylic acid, $C_1$–$C_{18}$ alkyl acrylates, methacrylic acid, $C_1$–$C_{18}$ alkyl methacrylate, maleic anhydride, itaconic acid, alkyl itaconates, vinyl acetate, ethylene, propylene, isobutylene and butadiene.

3. A vinylidene chloride copolymer film according to claim 1 wherein said particle dispersion type elastomer is in the form of particles which are covered with a polymer having high affinity for the vinylidene chloride copolymer.

4. A vinylidene chloride copolymer film according to claim 1 wherein said vinylidene chloride copolymer is melt-extruded through an annular die in the form of a cylindrical parison immediately quenched in water taken up between two pairs of pinch rollers having different surface velocity, and expanded by feeding compressed air to stretch it.

* * * * *